Figure 5:
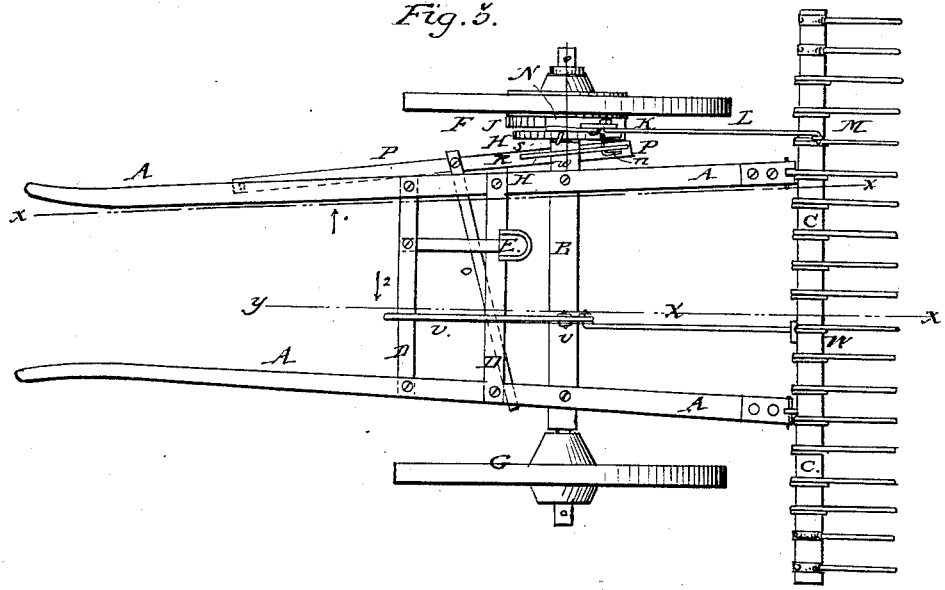

D. M. DUNHAM, & J. & A. WEBB.
Horse Hay-Fork.
No. 57,488.
2 Sheets—Sheet 1.
Patented Aug. 28, 1866.
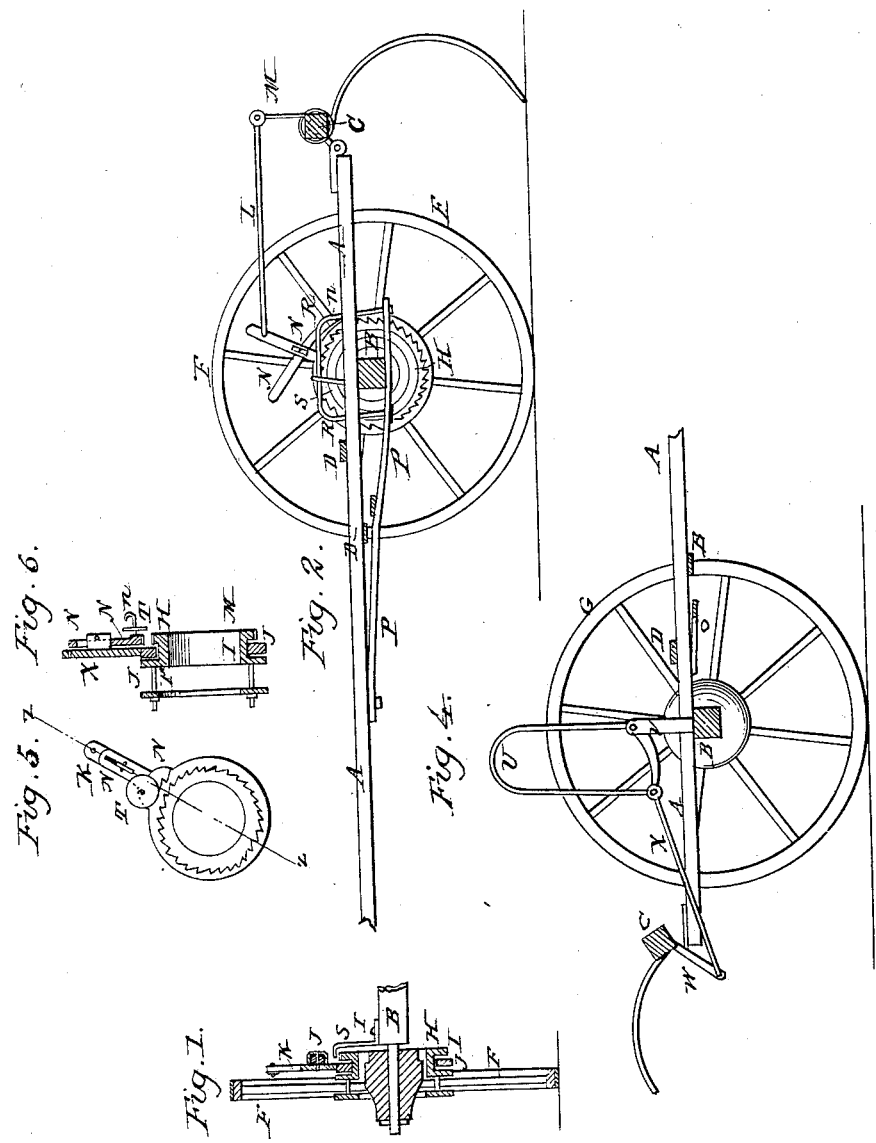

D. M. DUNHAM, & J. & A. WEBB.

Horse Hay-Fork.

No. 57,488.

2 Sheets—Sheet 2.

Patented Aug. 28, 1866.

UNITED STATES PATENT OFFICE

D. M. DUNHAM, JEREMIAH WEBB, AND ALBION WEBB, OF BANGOR, MAINE.

IMPROVEMENT IN HORSE-RAKES.

Specification forming part of Letters Patent No. 57,488, dated August 28, 1866.

*To all whom it may concern:*

Be it known that we, D. M. DUNHAM, JEREMIAH WEBB, and ALBION WEBB, of Bangor, in the county of Penobscot and State of Maine, have invented a new and useful Improvement in Horse Hay-Rakes; and we do hereby declare that the following is a full, clear, and exact description thereof, which will enable others skilled in the art to make and use the same, reference being had to the accompanying drawings, forming part of this specification, in which—

Figure 1 is a vertical detail section through the line $n\ n$, Fig. 3. Fig. 2 is a vertical section through the line $x\ x$, Fig. 3, looking in the direction of the arrow 1. Fig. 3 is a top or plan view of my improved horse-rake. Fig. 4 is a vertical section through the line $y\ y$, Fig. 3, looking in the direction of the arrow 2. Fig. 5 is a side view of a modification of the ratchet-wheel and pawl for discharging the rake. Fig. 6 is a section through the line $z\ z$, Fig. 5.

Similar letters of reference indicate like parts.

Our invention has for its object the furnishing a hay-rake from which the hay may be readily discharged, and the teeth of which may be readily held away from the ground while the rake is being transported from place to place; and it consists, first, in the combination of the ratchet-wheel, pawl, and sleeve with each other and with the rake-wheel and tooth-shaft; second, in the combination of a spring or springs and staple or circular rod with the pawl; third, in the combination of a stop with the pawl, for the purpose of releasing the ratchet-wheel from the pawl; fourth, in the combination of the bent lever with the frame of the rake and with the tooth-shaft, for the purpose of holding the rake-teeth down to their work, and also for holding the said teeth away from the ground while the rake is being transported from place to place.

A are the shafts to which the horse is attached. These shafts are attached to the axle B, and to their rear end is pivoted or hinged the shaft C, to which the teeth are attached.

D are cross-bars holding the shafts A in their proper position, and at the same time supporting the driver's seat E.

F and G are the wheels, which are attached to the axle B in the ordinary way. To one of the wheels, F, is attached a ratchet-wheel, H, having a neck, I, formed upon it, as represented in Fig. 1. This ratchet-wheel H may be attached to the wheel F by bolting a flange formed on the inner end of the said neck to a ring placed on the other side of the spokes of the wheel, as shown in Fig. 1, or in any other convenient way.

Upon the neck I is placed a sleeve, J, having a projecting arm, K. This sleeve J is free to move upon the neck I independent of the wheel F and of the ratchet-wheel H.

L is a connecting-rod, connecting the upper end of the arm K to an arm, M, attached to the shaft C, that carries the teeth.

To the arm K is pivoted a pawl, N, the upper end of which is made heavier than the lower end, so that it will be held away from the ratchet-wheel, except when forced down, as hereinafter described.

O is a wooden spring or bar, one end of which is attached to the shaft A farthest from the wheel F. The other end is attached to the wooden spring P. One end of this latter spring is attached to the shaft A nearest to the wheel F, and the other end is free, passing beneath the axle B, as seen in Fig. 2. To this spring P is attached a bent rod, R, passing around the axle C and over a pin or stop, $n$, projecting from the side of the lower end of the pawl N, as seen in Figs. 2 and 3. When the spring P is depressed, which may be done by the driver while sitting upon the seat E by pressing with his foot upon the spring O, the bent rod R forces down the pin $n$ and with it the pawl N, causing said pawl to engage with the ratchet-wheel H. This causes the sleeve J to revolve with the wheel F, carrying forward the arm K and discharging the hay from the teeth of the rake. As the wheel revolves the lower end of the pawl N comes in contact with and is lifted away from the ratchet-wheel H by the stop S, which is attached to the frame of the rake. This allows the teeth of the rake to drop again into their normal position.

The pawl N may be made in the form represented in Fig. 5, and instead of being pivoted to the arm K may slide upon a projection formed upon said arm, and may be raised from contact with the ratchet-wheel H by the small wheel T, passing over the stop S, being lowered by the bent rod R coming into contact with the pin $n$, upon which the wheel T revolves in the manner before described.

U is a bent lever, having its fulcrum at the end of an arm, V, attached to the axle B, as represented in Fig. 4, or to the frame of the rake. This lever is connected with an arm, W, attached to the shaft C by the rod X. When the lever U is in the position represented in Fig. 3, by slightly lifting upon the lever U the teeth of the rake are brought closer to the ground, and by raising the said lever U into the position shown in Fig. 4 the hay is discharged from the rake, and the rake-teeth raised to the position shown in Fig. 4, allowing the rake to be transported from place to place without inconvenience.

Having thus described our invention, we claim as new and desire to secure by Letters Patent—

1. The combination of the ratchet-wheel H, pawl N or equivalent, and sleeve J with each other and with the wheel F, to which they are attached, and by which they are operated, and with the shaft C, which they operate, substantially as described, and for the purpose set forth.

2. The combination of the springs P and O and bent rod R with the pawl N, for the purpose of causing the pawl to engage with the ratchet-wheel, substantially as described.

3. The combination of the stop S with the pawl N, for the purpose of disengaging the pawl from the ratchet-wheel, substantially as described.

4. The combination of the bent lever U with the frame of the rake and with the shaft C, substantially as described, and for the purposes set forth.

D. M. DUNHAM.
JEREMIAH WEBB.
ALBION WEBB.

Witnesses:
SAMUEL F. HUMPHREY,
CHARLES M. GRIFFIN.